Sept. 3, 1968 R. SCHEIDIG 3,400,256

COUNTING DEVICE

Filed June 15, 1965

3,400,256
Patented Sept. 3, 1968

3,400,256

COUNTING DEVICE

Rudolf Scheidig, Stuttgart-Feuerbach, Germany, assignor to International Standard Electric Corporation, New York, N.Y., a corporation of Delaware Filed June 15, 1965, Ser. No. 464,182
Claims priority, application Germany, July 3, 1964, St 22,349
11 Claims. (Cl. 235—92)

Figure 1:
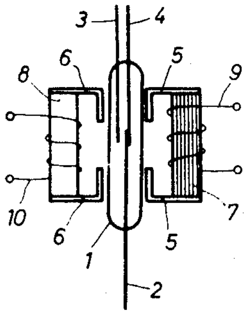

The invention relates to a counting device which consists of magnetic storage elements and armature contacts influenced by said elements, particularly reed contacts.

Such switching facilities of mixed mechanically immobile, e.g., magnetic switching elements, and mechanically mobile elements, e.g., reed contacts, are referred to in the art as partial-electronic facilities. Such a designation appears applicable when these devices are considered with reference to their switching speed, since they assume a position between electro-magnetic and electronic switching devices.

Conventional electro-mechanical counting devices are designed, for example, as relay switching chains which consist of a series-connection of bistable stages, with delay elements inserted. The bistable chain stages are frequently arranged as self-holding relay circuits. The advancing speed and, consequently, the maximum obtainable operating speed, for such counting chains, is generally limited by the switching period of the relays used. Therefore, such counting chains equipped with relays cannot be considered for a wide range of application. The same applies, to an even wider extent, to the conventional stepping counters of purely electro-mechanical construction, i.e., for automatically advancing relays and the like, known to the art.

The electronic counting devices known to the art have certain disadvantages in some applications, although the pulse repetition frequency to be processed is sufficiently high. An example of such a disadvantage is the general lack of galvanic decoupling between input and output circuits. Moreover, the limited number of mutually decoupled outputs of the electronic bistable chain stages is a disadvantage, whereas bistable relay stages can be equipped in principle with any number of contact sets.

An object of the invention is to provide a counting device of the above-mentioned type which provides increased operating speed compared with conventional relay chains and in this respect approaches the electronic chain circuits, but which preserves also the advantages of the relay circuits.

The problem is solved, according to the invention, in that each bistable magnetic element consists of a hard-magnetic body and a soft-magnetic body, with both bodies being arranged in series in a magnetic circuit and provided with two excitation or energizing windings, effective in the same sense but connected mutually in the opposite sense with at least one operating air gap of an armature contact. In this way the windings are arranged so that the magnetic effect on the contacts is ineffective during the pulse, but the system with the hard core magnetized by the pulse switches the contacts during the pulse interval. The winding of each bistable element is capable of being inserted into a counting pulse circuit by the action of each armature contact actuated by the preceding chain stage, or by several such contacts, by simultaneously magnetizing the hard-magnetic body which is practically de-magnetized in its original condition and, consequently, by cancelling their effects on their own armature contact.

It is achieved in this way that the hard-magnetic body is magnetized from a condition of low remanence by the field intensity generated by both windings in the common magnetic circuit, enabling said body to attract the armature contact.

Such response of the armature contact, however, does in fact not occur due to the opposite-sense winding of the soft-magnetic body on the operating air gap during the period of simultaneous energization of both windings, i.e. during the period of the counting pulse. This is of principal importance to the stepping (advancing) process, because by this the effect of a counting pulse is kept away from the succeeding chain stages which should be actuated only by the following counting pulses. By the response of the armature contact after the dying-out of the counting pulse the energization of the successive stage, however, can be prepared. Moreover, with this arrangement there is obtained an increase of the stepping or counting frequency respectively, because magnetization of the hard-magnetic body may be effected by relatively short current pulses, independently of the response of the one or more pertaining armature contacts, whereupon the delayed responding of the contacts may be effected during the pulse interval, due to the mechanical inertia.

An arrangement can also be made so that the armature contacts of the chain stages function as reed contacts. Due to the small moved masses of conventional reed contacts the pulse interval, including the response of the armature contacts can be kept very short and, consequently, the counting frequency can be further increased. For the sake of simplicity, the arrangement for obtaining an exact coincidence of the current flow through both windings of one chain stage is made in such a way that the windings of a bistable magnetic element, effective in the same sense, are capable of being connected in series in the counting pulse circuit.

Furthermore, the invention is appropriately designed in a way that the windings of a bistable magnetic element are capable of being disconnected from the counting pulse circuit due to the response of a switchover contact, effected upon dying-out of a counting pulse, with the said switchover contact being coupled to the magnetic bodies in the opposite sense, and with the said disconnection be effected together with the connection of the windings of the next successive counting stage.

This offers the advantage that each once actuated chain stage is separated from the counting pulse circuit, hence always only the windings of one stage are acted upon by a counting pulse circuit. The loading of the source of counting pulses thus remains unchanged during the counting process.

In particular, the counting device according to the invention can be used for such control tasks in which separate control circuits are supposed to be actuated by each counting stage. To this end the arrangement is appropriately made in such a way that a set of counting contacts is connected to the hard-magnetic body of each bistable magnetic element of a chain stage, besides the switchover contact causing the stepping-on of the counting chain.

Prior to the beginning of one cycle of the chain circuit, i.e. upon termination of a number of counting pulses corresponding to the number of the stages, the hard-magnetic bodies can be de-magnetized, and the chain stages may thus be restored to their normal condition. By this the arrangement is suitably made in such a way that for the hard-magnetic bodies of several chain stages one common de-magnetizing winding is provided.

If permitted by the magnetic data of the chain stages and if, in particular, a common resetting of the chain stages is undesirable, the arrangement can simply be made also thus that the winding of the soft-magnetic and/or of the hard-magnetic body of a chain stage can be connected, for demagnetization of the latter, to a pulse source correspondingly polarized in opposition to the counting pulses.

In detail, the circuit of the counting chain can be designed in such a way that the soft and hard magnetic bodies of one chain stage, which are each equipped with a winding, are connected with an opposite sense at both ends to a read contact serving as a switch, via flux-deflecting members, and the series-connected windings are connected at one end to the break-contact of the switch of the one chain stage, whose make-contact blade is connected to the switch-over contact blade of the next successive stage, and whose own switch-over contact blade is connected to the make-contact of the preceding stage, or to the counting-pulse input respectively, in the case of the first stage of the entire chain.

By using conventional simple relays it is also possible to arrange such a chain so that a number of contact-spring assemblies, associated with one chain stage, are each biased by a common magnetic circuit and are each actuated by a separate bistable magnetic element.

Figure 2:
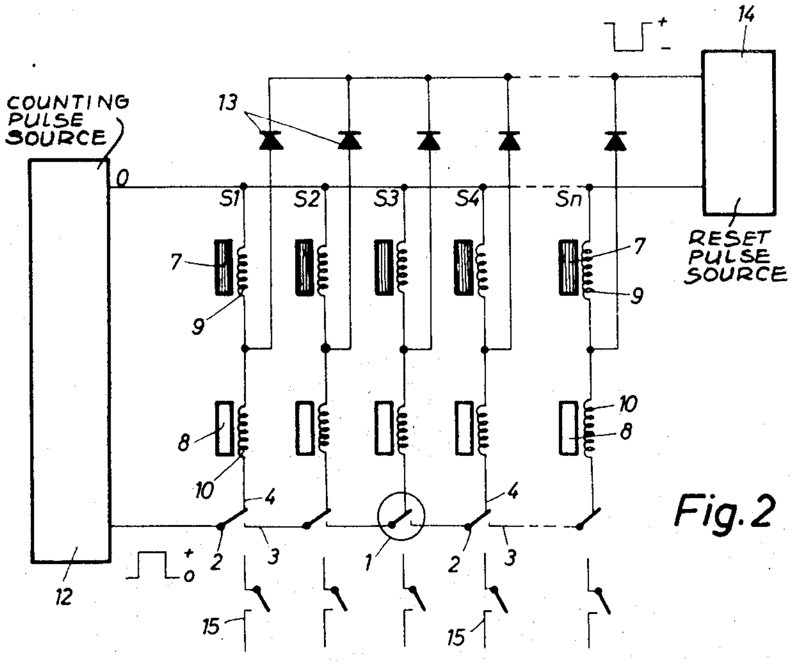
Figure 3:
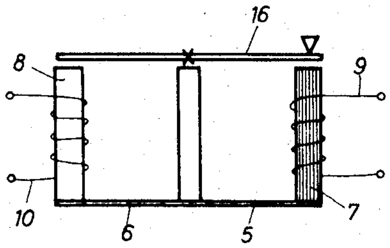

The invention will now be described with the aid of drawings, wherein:

FIG. 1 shows the arrangement of a bistable magnetic element with a reed contact, FIG. 2 shows the arrangement of a counting chain with bistable elements according to FIG. 1, and FIG. 3 shows another type of bistable magnetic element.

In FIG. 1 reference numeral 1 indicates a reed contact designed as a switch-over contact comprising a switch-over contact blade 2, a make-contact blade 3, and a break-contact blade 4. The break-contact is formed by the contact blade 2 which, under a mechanical pre-tension, touches contact blade 4. A make-contact is formed by the contact blade 2 which is attracted, when actuated, with its free end towards the contact blade 3 for closing a contact therewith.

Instead of such a switch-over contact another conventional contact arrangement of break-contact and make-contact can be used, whereby the non-operative position of the blade of the one contact is maintained by the effect of a separate permanent magnet. The make-contact and the break-contact are combined correspondingly to form a switch-over contact.

The reed contact 1 is connected to both a soft-magnetic body 8 and a hard-magnetic body 7 by flux-deflecting members 5 and 6, respectively. These magnetic bodies are each provided with a coil 10 and 9, respectively with the magnetic fields thereof, in view of a common magnetic circuit, completed via both magnetic bodies 7 and 8, or via the flux-deflecting members 5 and 6 respectively, acting in the same direction. The magnetic fields of the two magnetic bodies or coil windings respectively, cancel each other, at least partially, due to their connection in the opposite sense via the flux-deflecting members 5 and 6 in the armature contact when being suitably dimensioned, provided that both windings are acted upon by current. In that case the armature contact will remain in its indicated non-operative condition. If, after magnetizing the hard-magnetic body 7, the current excitation in both windings dies out, the effect of the hard magnetic body on the armature contact 1 will remain and will cause the contact to respond. By energizing the winding 9 of the hard-magnetic body 7 in the opposite sense, the latter can be de-magnetized again, and the armature contact may be caused to drop off.

FIG. 2 shows the arrangement of a contact chain with the bistable magnetic elements according to FIG. 1. The windings 9 and 10 are connected in series within each chain stage S1, S2, S3 . . . S*n*, and are connected together in common for the entire chain to one pole of the source of counting pulses 12. The opposite ends of the series-connected windings 9 and 10, are in each chain stage connected to the reed contact 1, viz. to the break-contact blade 4 thereof, whereas the contact blade 2 is connected in the case of the first chain stage to the second pole of the source of counting pulses 12, or in the case of the following stages, to the make-contact blade 3 of the reed contact 1 of the respective preceding chain stage via both the break-contact blade 4 and the switch over contact blade 2 of the reed contact 1 of the one chain stage.

The connecting points of the windings 9 and 10 are led from all chain stages, via decoupling diodes 13, to a source of reset pulses 14 effective in the sense opposite to the source of counting pulses. To the hard-magnetic bodies 7 of each chain stage separate armature contacts 15 are still connected serving as counting contacts for control purposes, and the like. From this arrangement, the following mode of action results: If, in the normal condition, the hard-magnetic bodies of all chain stages are de-magnetized then the associated switch-over contacts 1 will assume the non-operative condition as shown on the drawing. Upon appearance of a counting pulse at the source of counting pulses 12 both windings 9 and 10 of the stage S1 are energized due to the non-operative condition of the switch-over contact 1, and the hard-magnetic body 7 is magnetized. During the pulse period the switch-over contact 1 of the chain stage S1 is prevented from responding due to the opposite-sense effect of both magnetic bodies, so that all succeeding chain stages will remain uninfluenced. Only after the counting pulse has died out, the switch-over contact 1 will respond and will remain in this position, i.e., the connection of the switch-over contact blade 2 to the make-contact blade 3 will remain until the hard-magnetic body 7 is de-magnetized. Together with the switch-over contact 1 of the first counting stage the counting contacts 15 of the chain stage S1 also respond, whereby the first counting step is completed. By the response of the switch-over contact 1 of the stage S1 the output of the source of counting pulses 12 is connected through to the following stage S2 and, consequently, the next counting step is prepared. Moreover, the windings 9 and 10 of the stage S1 are disconnected from the source of counting pulses 12. The following counting pulse is now led exclusively to the windings 9 and 10 of the stage S2, where it completes the second counting step and, in the way described above, prepares the third counting step in the following stage S3.

When the counting process has passed the chain, i.e., when the stage S*n* has performed its counting step, the restoring pulse source, or reset pulse source 14, furnishes an impulse to all windings 9 of the hard-magnetic body 7 of all stages S1 to S*n* in the opposite sense and demagnetizes them to such an extent that the contacts 1 and the counting contacts 15 drop. The normal condition is thus restored.

FIG. 3 shows the construction of a bistable magnetic element according to the invention without reed contacts. Here too, a soft-magnetic and a hard-magnetic body are each provided with a winding, which operate in the manner described in FIG. 1 and which bear the same references as the parts in FIG. 1.

The magnetic bodies, however, exert an effect, deviating from the arrangement as shown in FIG. 1, upon a conventional, pivoted armature 16 and their respective effects are mutually cancelled when both windings are energized. The armature 16 can actuate conventional contact sets which may be arranged in a way as shown in FIG. 2.

While the principles of the invention have been described above in connection with specific apparatus and applications, it is to be understood that this description is made only by way of example and not as a limitation on the scope of the invention.

What is claimed is:

1. A counting device incorporating
a chain circuit with bistable magnetic elements in which the advance of different switching conditions from one stage to the following is performed by contacts controlled by magnetic elements,
said device comprising a plurality of bistable magnetic elements, said elements including a hard-magnetic body and a soft-magnetic body, means connecting said bodies in series in a magnetic circuit, said magnetic circuit including two excitation windings effective in the same sense but connected mutually in the opposite sense, an armature contact including at least one operating air gap, said excitation windings being arranged in such a way that the magnetic effect on the armature contact is ineffective during a pulse, said soft magnetic core losing its magnetism between pulses, and the hard-magnetic core retaining its magnetism to keep the contacts actuated during pulse intervals.

2. A counting device according to claim 1, in which the winding of a particular bistable magnetic element is inserted into a counting pulse circuit by the actuation of an armature contact associated with a preceding bistable magnetic element, said particular bistable element then being activated by first magnetizing the hard-magnetic body and the soft magnetic body which are practically de-magnetized in their original condition, and, consequently, by activating an armature contact associated with the particular bistable element to prepare a succeeding bistable element.

3. A counting device according to claim 1, in which the armature contacts of the chain stages are reed contacts.

4. A counting device according to claim 1 in which the windings of a bistable magnetic element, mutually effective in the same sense, are series-connected with a counting pulse circuit.

5. A counting device according to claim 1 in which the windings of a bistable magnetic element are capable of being disconnected from the counting pulse circuit due to the response of a switch-over contact effected upon dying-out of a counting pulse, said switchover contact being coupled to the magnetic bodies in the opposite sense, and said disconnection being effected together with the connection of the windings of the next successive stage.

6. A counting device according to claim 1, in which the hard-magnetic body of each bistable magnetic element of a stage is connected to a switch-over contact effecting the advance of the counting chain and the hard-magnetic body is coupled magnetically to one of a set of counting contacts.

7. A counting device according to claim 1 in which a common de-magnetizing winding is provided for the hard-magnetic bodies of the counting device.

8. A counting device according to claim 1, in which a pulse source to provide pulses polarized oppositely to the counting pulses is applied to the windings of the hard-magnetic body of one chain stage to de-magnetize the hard-magnetic body.

9. A counting device according to claim 1, in which the soft-magnetic and hard-magnetic bodies provided with one winding each of one chain stage are connected with an opposite sense at both ends to a reed contact serving as a switch-over contact via flux-deflecting members, and the series-connected windings are connected at one end to the break-contact of the switch-over contact of one chain stage whose make-contact blade is connected to the switch-over contact blade of the next successive stage, and whose own switch-over contact blade is connected to the make contact blade of the preceding stage.

10. A counting device according to claim 1, in which a number of contact spring assemblies, associated with one chain stage, are each biased by a common magnetic circuit, and each is actuated by a separate bistable magnetic element.

11. A counting device substantially as claimed in claim 9 in which the switch-over contact blade is part of the first stage of the entire chain and is connected to the counting-pulse input.

References Cited

UNITED STATES PATENTS

| | | | |
|---|---|---|---|
| 2,859,359 | 11/1958 | Olson | 235—92 |
| 2,943,301 | 6/1960 | Loev | 235—92 |
| 2,958,077 | 10/1960 | Svala | 235—92 |

MAYNARD R. WILBUR, *Primary Examiner.*

G. J. MAIER, *Assistant Examiner.*